Oct. 30, 1934.    A. C. BECKER    1,978,397

GAS PRESSURE REGULATOR

Filed Sept. 12, 1927

Inventor
Alfred C. Becker
By
Henry Orth
att.

Patented Oct. 30, 1934

1,978,397

UNITED STATES PATENT OFFICE 1,978,397

GAS PRESSURE REGULATOR

Alfred C. Becker, Charlottenburg, near Berlin, Germany

Application September 12, 1927, Serial No. 219,100
In Germany October 29, 1926

8 Claims. (Cl. 50—21)

The invention relates to a gas-pressure regulator and possesses the following advantages over known constructions:

Little space required, low cost of manufacture, permanent safe and reliable working, no rodding and no intermediate levers with turning parts are practical advantages of the device. The consumption pressure remains exactly the same, even when the pressure in the main rises and falls within a very wide range. On the other hand there is no variation of the consumption pressure, even when the amounts consumed fluctuate within wide limits as, for instance, when, in a lighting installation, in one case only five jets are burned and in another case 50. The consumption pressure is regulable. It can, for instance, at a pressure of 300 mms. water column in the main, be regulated for 50 or 60 or 70 mms. as may be required. When the gas-pressure regulator has been set for a certain consumption pressure, this pressure remains unchanged in the consumption pipes, no matter whether the pressure in the main is subject to fluctuations or not or whether it rises and falls continually, and regardless of whether considerably greater or smaller quantities of gas are being used.

The possibility of automatically maintaining the consumption pressure for each user permanently uniform at the desired height, and that even at a much higher pressure in the main is of great economic importance. After building in such gas-pressure regulators, desirably just in front of the gas-meters in the various dwellings, it is possible to use a considerably higher gas-pressure in the existing city mains and to convey the gas under this higher pressure to the various users. Hereby a much better utilization of the present mains is rendered possible, in particular, the further connection of entirely new city sections to the present supply pipes which at the present low pressure are already utilized to their fullest extent. The installation of gas-pressure regulators of this description in front of the gas-meters of the various users further permits the supply of gas at the required higher pressure for business establishments in the same house such as bakeries, welding establishments, large gas-kitchens or the like, without such establishments being under the necessity of providing expensive gas-pressure plants. The increase of the pressure in the mains of the entire city or of one or more districts thereof, rendered possible by the installation of such gas-pressure regulators, further facilitates the connection of these mains to long distance mains run at very high pressure and fed by gas-works located at a considerable distance from the city as, for instance, in the vicinity of coal mines or run jointly with coke-works or blast furnaces.

An embodiment of the invention is shown in the drawing, to-wit:

Figure 1:
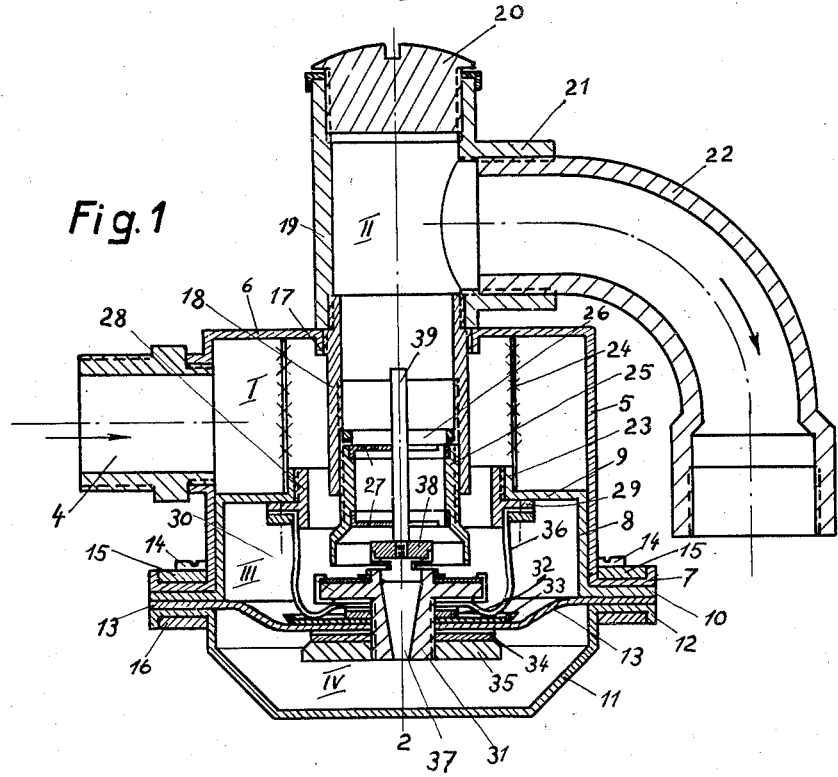
Fig. 1 is the vertical section of a gas-pressure regulator in section along the line 1—1 of Fig. 2.
Figure 2:
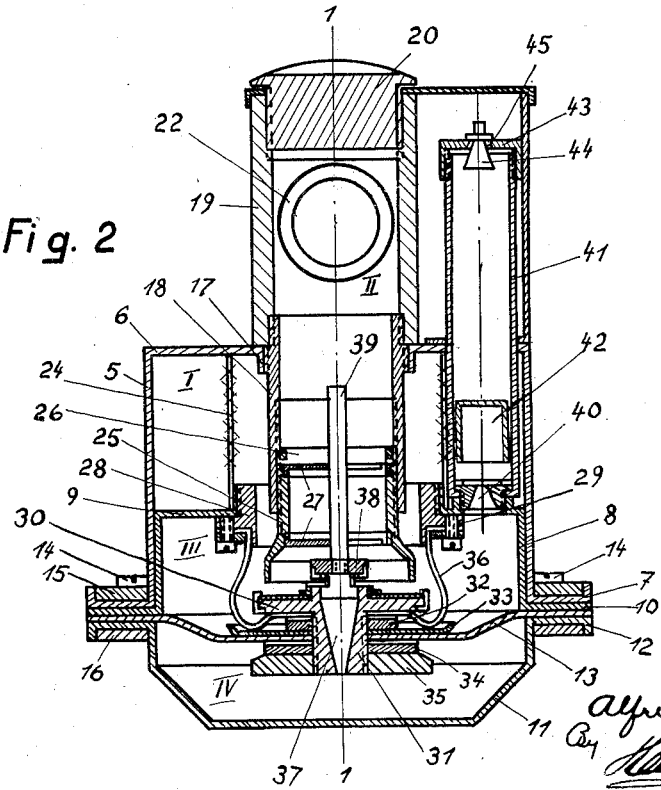
Fig. 2 is the corresponding lateral view in section along line 2—2 of Fig. 1.

5 is the lateral wall of a cylindrical case open at the bottom and closed at the top by the flat wall 6, and provided at its lower end with an external annular flange 7. The gas supply pipe 4 is screwed into the lateral wall 5 of the cylindrical case. A second, lower cylindrical case is inserted from below into the cylindrical case above referred to, the lateral walls of said second cylindrical case being designated by 8 and its upper flat wall by 9, and it likewise is provided at the bottom with an outer annular flange 10. 11 is a dish-shaped cover open at the top and provided with an external annular flange 12. A circular diaphragm 13 of soft leather is held by its outer rim between the two flanges 10 and 12. The parts mentioned are held pressed tightly together by means of the screws 14 and the annular disks 15 and 16. The upper wall 6 has a central circular opening which is enclosed by a downwardly projecting cylindrical flange 17. Into this flange 17 a pipe 18 is screwed in from below, the lower end of which is provided with an inner thread, the upper end projecting above the wall 6, being provided with an outer thread. On the upper end of the pipe 18 a pipe 19 is screwed, which is closed at the top by a screw 20. The pipe 19 has at the side a branch 21 to which the pipe leading to the service pipe 22 is connected. The flat wall 9 has a central opening which is surrounded by an upwardly projecting flange 23. On this flange 23 is a cylindrical wire sieve 24 extending from the wall 9 to the wall 6. Into the lower end of the pipe 18 a pipe piece 25 is screwed which widens downwardly into an inverted cone, being secured in position by an annular locknut 26. The pipe piece 25 is provided within with two three-armed stars 27 which serve to guide the valve-rod to be described later on. After removing the closing screw 20 the lock-nut 26 and the pipe 25 may be turned by means of proper wrenches and accordingly set at any desired elevation. A pipe piece 28 carrying a flange 29 is screwed into the flange 23. Above the diaphragm 13 is a circular plate 30, bearing a stud 31 which passes through said diaphragm, said plate being secured to the diaphragm 13 by means of the washers 32, 33, 34 and the nut 35. A cylindrical diaphragm 36 of soft leather is, at its upper end, secured to the pipe piece 28, and at its lower end, to the plate 30. The plate 30 and the stud 31 are drilled through. The nozzle like downwardly tapering passage 37 connects the chamber above the plate 30 with the closed chamber below the diaphragm 13. On the upper side of the plate 30 at a short distance from the plate a bridge 38 is secured, into which an axial pin 39 is screwed fast. This pin 39 is guided in the three-armed stars 27 of the pipe piece 25. The circular plate 30 lies opposite the lower aperture of the pipe piece 25 and acts as valve. By means of the above-mentioned walls, pipes and diaphragms the chamber above the diaphragm 13, of the case, is divided into three sub-chambers. The sub-chamber I is connected with the gas supply pipe 4 and consists of the annular chamber described at the top by the wall 6, below by the wall 9, without by the wall 5 and within by the pipe 18, further of the annular chamber described without by the pipe piece 28 and the diaphragm 36 and within by the pipe 18 and the pipe piece 25. The sub-chamber II is connected with the service pipe and is laterally limited by the pipes 19, 18 and 25. The sub-chambers I and II are interconnected by the annular aperture between the lower front surface of the pipe piece 25 and the valve-plate 30. The sub-chamber III is enclosed at the top by the flat wall 9, at the bottom by the diaphragm 13, on the outside by the wall 8 and on the inside by the diaphragm 36. Between the sub-chamber III and the sub-chambers I and II is no communication, whereas sub-chamber III is in communication with the atmospheric air by means of an aperture 40 into a vertical pipe 41. In this pipe is a bell 42 of light material, the external diameter of which is slightly less than the internal diameter of the pipe 41. The pipe 41 is closed at the top by a cover 43, in which there is an aperture 45 closing by means of a light valve 44. As long as the valve 44 is open, the sub-chamber III is in communication with the atmospheric air. Below the diaphragm 13 is an enclosed chamber IV which is only in communication with the sub-chamber II by the aperture 37.

The mode of operation of the above described gas-pressure regulator is as follows:

In sub-chamber I is always the same pressure as in the gas supply pipe as, for instance, a pressure of 300 mms. water column above atmospheric. In sub-chamber II the pressure, when gas is being used, is less than that of the gas supply pipe and which, in a manner still to be described, always remains at a regulable permanent height, as, for instance 50 mms. water column. This pressure in the service pipe while gas is being used is to be termed "consumption pressure".

It is now first to be assumed that the gas consumption is interrupted, that is, for instance, when all jets are turned off. In this event, as a result of the connection of sub-chamber I with sub-chamber II, the pressure in sub-chamber II and accordingly in chamber IV as well, will rise a little, say 10 mms. water column, above the "consumption pressure". This slight overpressure is sufficient to lift the diaphragm 13 enough to cause the valve-plate 30 to press against the lower aperture of the pipe piece 25, so that the valve is closed.

If gas is now used from the service pipe, the pressure in sub-chamber II, and accordingly in chamber IV as well, drops at once. The higher pressure prevailing in sub-chamber I acts on the annular surface surrounding the pipe piece 25, of the system connected with the diaphragm 13, pressing down the diaphragm 13 and the valve-plate 30. Gas now flows through the annular slit between the lower aperture of the pipe piece 25 and the valve-plate 30 into the sub-chamber II, whereby the pressure in sub-chamber II is again increased. Hereby the pressure in chamber IV also rises. When this pressure becomes too high the diaphragm is again raised, the annular slit between sub-chambers I and II reduced in size, a stronger throttling of the gas takes place in view of the higher pressure in sub-chamber I with respect to sub-chamber II and the pressure in sub-chamber II and in chamber IV again sinks. When the diaphragm is in a certain position and the plate 30 as well, the forces acting on the upper surface of the diaphragm are in equilibrium with those acting on the lower surface of the diaphragm. In this position a certain pressure prevails in the sub-chamber II.

By setting the pipe piece 25 higher or lower it is possible to regulate at will the higher pressure in sub-chamber II and in the consumption pipe, which is effected by means of the gas-pressure regulator. The higher the pipe piece 25 is set, the higher will be the service pressure regulated by the gas-pressure regulator. The lower the pipe piece 25 is set, the lower will be the service pressure regulated by the gas-pressure regulator. The sub-chamber III is in communication with the atmospheric air by an aperture 40, the round slit between a bell 42 of light material and the inner wall of a vertical pipe 41 as well as an aperture 45 in the cover 43 of the pipe 41. Should the pressure in the supply pipe be suddenly reduced, or a less amount of gas be suddenly taken from the service pipe, whereby the diaphragm 13 is naturally raised, the volume of sub-chamber III is quickly reduced. In this event the air flows out of sub-chamber III through the opening 40, and first lifts the bell 42 which, however, may gradually fall again, as the air can escape slowly through the annular space between the bell 42 and the pipe 41. Should at any time the diaphragm 13 or the diaphragm 36 become leaky and as a result thereof gas enter sub-chamber III, thereby causing a certain overpressure therein, the bell 42 is raised by this overpressure and the lower specific gravity of the gas. The bell strikes, in its highest position the valve 44 which it closes and keeps closed as long as an overpressure is present in sub-chamber III. Any escape of gases is thus prevented, even in the event of the diaphragms 13 and 36 being damaged.

In the event of the gas-pressure regulator being exposed to high temperatures the diaphragm 13 and possibly the diaphragm 36 as well, instead of being made of leather, must be made of some other suitable material for such temperatures.

The gas-pressure regulator described as above, merely constitutes one embodiment of the invention. Various parts may be built differently and in other dimensions without departing from the scope of the invention.

I claim:

1. In a pressure regulator for illuminating gas, a casing included between the main supply pipe and the service pipe, a diaphragm across said casing forming a chamber positioned below said diaphragm, a valve carried by said diaphragm having a passage therethrough to the said chamber, a second tube-like diaphragm substantially concentrically surrounding the end of the service pipe and being connected to said valve, into which the supply pipe discharges, and means for venting the chamber, formed between the two diaphragms and the inner wall of the casing, to the atmosphere.

2. In a pressure regulator for illuminating gas, a casing included between the main supply pipe and the service pipe, a diaphragm across said casing, a valve carried by said diaphragm having a passage therethrough to the chamber below the diaphragm, a second diaphragm surrounding the end of the service pipe and valve, and connected thereto, and into which the supply pipe discharges, and venting means for venting the chamber, formed between the two diaphragms and the inner wall of the casing, to the atmosphere, said venting means including a device to close said venting means upon an abnormal rise of pressure in said latter chamber.

3. In a pressure regulator for illuminating gas, a casing connected between the main supply pipe and the service pipe, a diaphragm across said casing, a valve carried by the diaphragm cooperating with the service pipe and having a passage therethrough for the passage of gas beneath the diaphragm, a second diaphragm surrounding the end of the service pipe and valve into which the supply pipe delivers gas and forming with the first diaphragm and casing a chamber surrounding the second diaphragm, a pipe connected to the casing for venting said chamber to the atmosphere, a bell movable in said pipe, and a valve at the top of the pipe arranged to be closed by said bell when over-pressure exists in said chamber.

4. In a pressure regulator for illuminating gas, a casing included between the main supply pipe and the service pipe, an open-ended pipe projecting from the casing to which the service pipe is connected between its ends, a cap for the upper end of said open-ended pipe, a valve seat adjustable in the lower end thereof, a diaphragm across the casing, a valve on the diaphragm having a passage therethrough to pass gas below the diaphragm, a second diaphragm surrounding the open-ended pipe and valve, into which the supply pipe delivers gas for passage to the open-ended pipe, and means to vent the space between the diaphragms and casing to the atmosphere.

5. In a pressure regulator for illuminating gas, a casing included between the main supply pipe and the service pipe, two diaphragms within said casing, a chamber at one side of the first said diaphragm, a continuously open communication between said chamber and said service pipe, a closable conduit at one side of the second of said diaphragms with an edge around which the gas from the main pipe may escape, when the conduit is in an unclosed position, means on said second diaphragm adapted to close said closable conduit, said means being, in addition to their own weight, solely under the influence of the gas in said pipes.

6. In a pressure regulator for illuminating gas according to claim 5, said chamber being arranged below said two diaphragms.

7. In a pressure regulator for illuminating gas according to claim 5, the weight of said closing means being directed in the direction of the pressure in said supply pipe on said second diaphragm.

8. In a gas pressure regulator, a movable valve head, a fluid supply, means adapted to actuate the said valve head by said fluid, a chamber into which the fluid enters when the said actuating means become defective, a wall located between the said chamber and the open air and provided with an opening, a movable element adapted to close the said opening by the aid of fluid entering the said chamber.

ALFRED C. BECKER.